Jan. 1, 1924

N. K. BOWMAN

TOOL FOR SPLICING CABLES

Filed Feb. 3, 1920

1,479,362

Inventor.
N. K. Bowman.

by Lacy & Lacy
his Attys.

Patented Jan. 1, 1924.

1,479,362

UNITED STATES PATENT OFFICE.

NEWTON K. BOWMAN, OF CANTON, OHIO.

TOOL FOR SPLICING CABLES.

Application filed February 3, 1920. Serial No. 356,072.

*To all whom it may concern:*

Be it known that I, NEWTON K. BOWMAN, a citizen of the United States, residing at Canton, in the county of Stark and State of Ohio, have invented certain new and useful Improvements in Tools for Splicing Cables, of which the following is a specification.

This invention relates to a tool for splicing cables by means of a cable splicing member such as is set forth in my previous Patent No. 1,304,534, issued May 27, 1919.

The invention also provides a tool whereby compressing dies are brought together on a cable splicing member previously placed upon the joined ends of the cable and the cable splicing member securely and finally clamped in place.

A further object of the invention is to provide a splicing tool in which one or more cables may be accommodated simultaneously either for the purpose of splicing two cables contained in the same insulating covering such, for instance, as in a duplex cable, or for splicing one cable of a duplex cable without affecting the other, or for simultaneously splicing two different size cables.

Still another object of the invention is the provision of a tool having pivotally associated members, each of which carries part of a cable splice compressing die and part of an anvil whereby the complete tool forms both a cable splice compressing means and an anvil which may be easily carried around.

Figure 1:
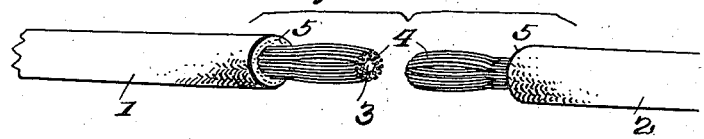
Figure 1 is a view showing two separated cable ends in which the twist has been removed from the strands thereof.
Figure 2:
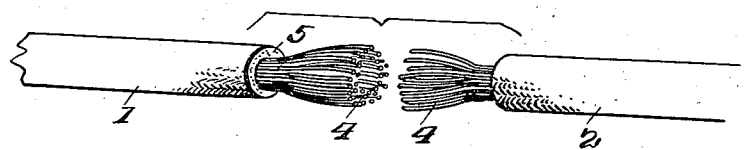
Fig. 2 is a view similar to Fig. 1 but with the cable strands flared.
Figure 3:
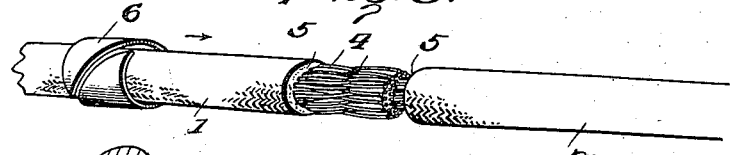
Fig. 3 is a similar view with the cable strands joined in end-wise relation ready for splicing and with the splicing sleeve in position for slipping thereover.
Figure 4:
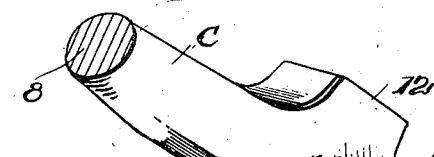
Fig. 4 is a view of the splicing tool with the cable in position for finally fixing the splice.

In detail:

With particular reference to Figs. 1 to 4 the ends 1 and 2 of a cable which is composed of the core wire 3 and the surrounding spiral strands 4 are cleared of their insulation 5 for a short distance from each end and are tapped with a hammer on a suitable anvil 12 such as will be hereinafter set forth until the twist in the strands is removed. The strands are then flared from the core wire as shown in Fig. 2 and the core wire cut back from one end so that the strands of the ends will fit together when the cable ends are brought in endwise relation as shown in Fig. 3, a splicing member 6 such as shown in my previously mentioned patent having been first placed over the cable as shown. After the ends have been brought together as shown in Fig. 3 the splicing member 6 is placed over the same and may substantially fill the gap between the insulation 5. The cable is then placed in the jaws or dies 7 and 7' of a compressing tool B and such jaws brought together to contract the splicing member tightly around the splice. If desirable the splicing member may be touched up with a hammer after being compressed in order to further press the points of the splicing member 6 into the cable splice. After the splicing member 6 is completely contracted around the cable splice the same may be wrapped with suitable insulating material such as tape or the like.

Figure 5:
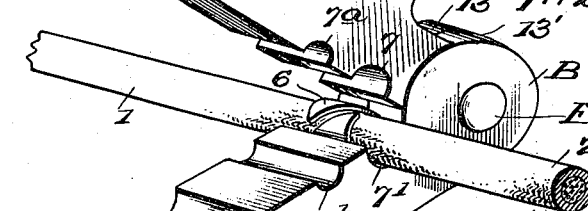
Fig. 5 is a side elevation of the cable splicing tool.
Figure 5:
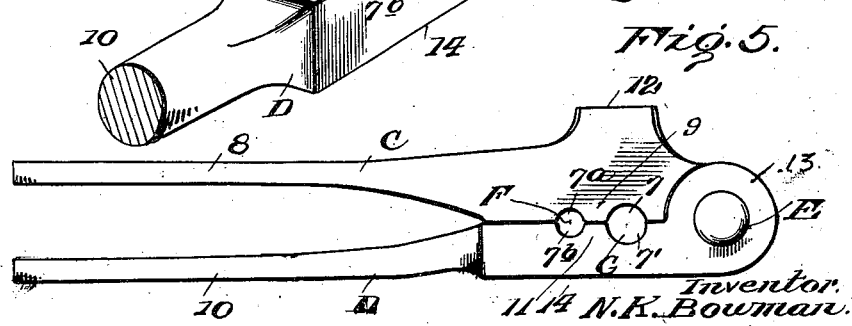

The splicing tool consists of the two levers C and D pivotally associated at E. One of the levers C comprises a handle portion 8 having the die 9 integral therewith and carrying jaws 7 and 7ᵃ while the other handle member 10 has the die portion 11 integral therewith and carries the jaws 7' and 7ᵇ cooperating with the previously mentioned jaws 7 and 7ᵃ to form the cable receiving passages F and G as indicated in Fig. 5. The upper side of the die portion 9 of the handle 8 is formed into an anvil head 12 while the lower side of the die portion 11 of the handle 10 is formed into an anvil seat 14 and thus the tool, when closed as shown in Fig. 5 forms an anvil having handles as indicated and the anvil portion of which may be rested on any solid surface for use.

The handle members 8 and 10 are pivotally associated by reason of the fact that the eye 13 of the member 8 cooperates with a similar eye 13' of the member 10 with a pivot E passing through the two.

In the splicing of a single cable such as is indicated in Figs. 1 to 4, the proper size splicing jaws are selected for properly compressing the cable splicing member 6 around the cable. When the tool is used for repairing duplex cables in which one or both cables may be fractured, the spliced joint of the fractured cable of the duplex cable is placed in the opening F for compression of the splicing member 6 while the other cable is placed in the opening G. The advantage of this construction is that due to the proximity of the two passages F and G the covering of the duplex cable need be cleared away from the broken ends only a sufficient distance to permit the two cables to separate sufficiently to seat in said passages with the result that a neat substantial and practical repair may be effected without materially destroying the insulation of the duplex cable.

I claim:

A splicing tool comprising two lever handle members, each including a cylindrical shank and a head portion of rectangular cross section, said head portions being pivoted together and having flat opposing faces, said head portions being provided with transverse, substantially semicircular mating passages of graded sizes opening in said opposing faces and adapted to fit around and compress splicing elements, said flat faces abutting throughout their area on both sides of and between said passages when the tool is closed to limit the compression of the splicing elements, one of said head portions having a projection forming an anvil head and the other head portion having an anvil base; whereby a substantially solid anvil is produced on which preliminary and finishing work of splicing may be performed.

In testimony whereof I affix my signature.

NEWTON K. BOWMAN. [L. S.]